358-84
1/5/88
SR
XR 4,718,106

United States Patent [19]
Weinblatt
[11] Patent Number: 4,718,106
[45] Date of Patent: Jan. 5, 1988

[54] SURVEY OF RADIO AUDIENCE

[76] Inventor: Lee S. Weinblatt, 797 Winthrop Rd., Teaneck, N.J. 07666

[21] Appl. No.: 862,107

[22] Filed: May 12, 1986

[51] Int. Cl.[4] .............. H04B 17/00

[52] U.S. Cl. .............. 455/2; 358/84; 379/92

[58] Field of Search .............. 455/2, 226; 179/2 AS; 358/84; 379/92

[56] References Cited

U.S. PATENT DOCUMENTS 2,766,374 10/1956 Hoffmann .............. 455/2
3,803,349 4/1974 Watanabe .............. 358/84
4,258,386 3/1981 Cheung .............. 358/84
4,613,904 9/1986 Lurie .............. 358/84
4,618,995 10/1986 Kemp .............. 455/2
4,626,904 12/1986 Lurie .............. 455/2

*Primary Examiner*—Robert L. Griffin
*Assistant Examiner*—Elissa Seidenglanz
*Attorney, Agent, or Firm*—Frishauf, Holtz, Goodman & Woodward

[57] ABSTRACT

A technique for surveying an audience. A portable signal detector unit picks up audible sounds reproduced by a radio set from signals transmitted by a given radio station. Among the broadcast signals is one unique to that particular station. The unit includes means capable of identifying that signal to automatically electronically record the fact that the station is being listened to by the carrier of the unit.

10 Claims, 1 Drawing Figure

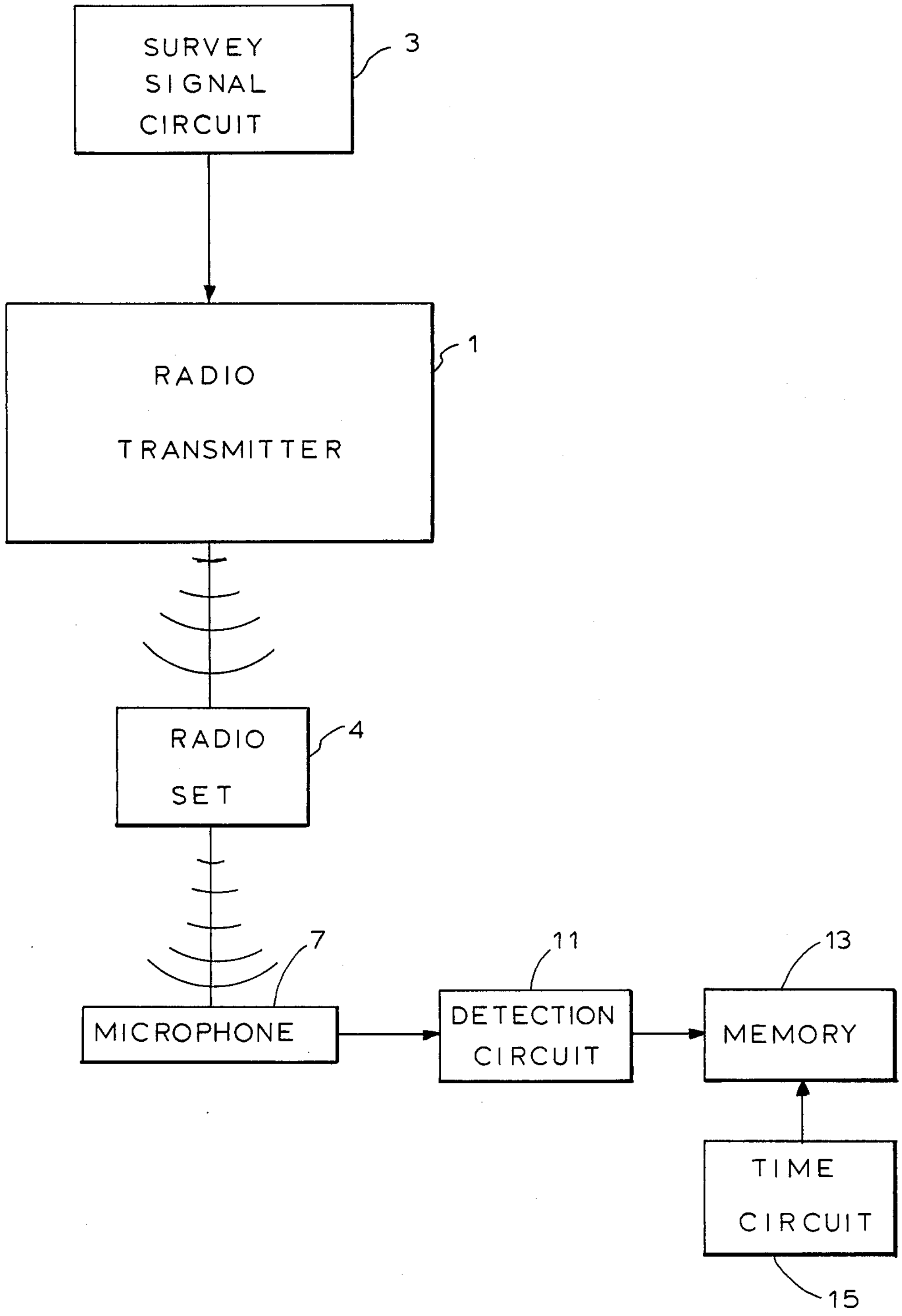
SURVEY SIGNAL CIRCUIT
3
RADIO TRANSMITTER
1
RADIO SET
4
MICROPHONE
7
DETECTION CIRCUIT
11
MEMORY
13
TIME CIRCUIT
15

SURVEY OF RADIO AUDIENCE

BACKGROUND OF THE INVENTION

This invention is directed to surveying an audience to determine whether it is tuned to a given radio station and, more particularly, to a technique which utilizes an apparatus carried on the person of individuals acting as test subjects that is responsive to unique signal transmitted by the selected radio station and automatically stores information indicative of a radio near the test subject being tuned to the radio station of interest.

It is important for a number of reasons to survey an audience to determine to what extent it is tuned at any given time to a particular radio station. Advertisers are, of course, interested in determining the number of people exposed to their broadcast commercials and to characterize their listeners by economic and social categories. Broadcasters find the statistics regarding audience size and type beneficial in setting their advertising rates.

Prior art techniques for obtaining such information involve primarily the following approaches. People within the range of the radio station are contacted by phone and interviewed regarding their listening habits. Each person is questioned about the radio stations which that individual listened to during the previous, say, twenty-four hours. However, this technique is suspect because it is subject to recall errors as well as possible bias introduced by the interviewer. If specific radio stations are mentioned to the person being interviewed, the suggestion may elicit a positive response when tuning to that particular station actually did not occur. Another technique involves keeping diaries by persons agreeing to act as test subjects. Diary entries are to be made throughout the day to keep track of what stations are being listened to. The diaries are collected periodically and analyzed. However, this approach is prone to inaccuracies because the test subjects may fail to make entries due to forgetfullness or laziness. Thus, it can be readily seen that the recall-dependent approach first described above is unsatisfactory because people may not accurately remember what radio station they listened to at any particular time and, also, because of the potential problem of suggestive bias. The diary-based approach is likewise unsatisfactory because people may not cooperate and be as meticulous as required to obtain the desired record-keeping accuracy.

SUMMARY OF THE INVENTION

It is the primary object of the invention to provide a radio audience surveying technique which is implemented automatically without the need for a deliberate record-keeping act by a test subject.

A further object of the invention is to provide a radio audience surveying technique which is accurate yet relatively simple and inexpensive.

These and other objects of the invention are attained by an apparatus for surveying an audience tuned to a given radio station transmitting designated programming on a predetermined frequency along with a survey signal characteristic of that given radio station. When the programming signal and the characteristic survey signal are detected and audibly reproduced by a radio set, a first means detects the audible sounds reproduced by the radio set. A second means is included for detecting the reproduced survey signal to generate a store signal in response thereto. A memory means is coupled to the second detecting means for storing a signal indicative of each detection of the survey signal.

Another aspect of the invention is directed to a method of surveying an audience tuned to a given radio station transmitting designated programming in a predetermined frequency along with a survey signal characteristic of the given radio station. The programming and the characteristic signal can be detected and audibly reproduced by a conventional radio set. When this occurs, the method comprises the steps of: detecting the audible sounds produced by the radio set, detecting the reproduced survey signal to generate a store signal in response thereto, and storing a signal indicative of such detection of the survey signal in response to said store signal.

BRIEF DESCRIPTION OF THE DRAWING

The drawing is a schematic block diagram of the invention.

DETAILED DESCRIPTION OF THE DRAWINGS

To conduct the survey, persons are selected by the surveying organization based on certain criteria. These criteria can be, for example, age, income, geographic location, sex, and level of education. The broadcasting organization and/or advertisers may require an analysis of their listeners which is broken down into one or more of these categories. The individuals who are approached to be test subjects are merely asked to participate in a test the details of which are not explained. Each person is told only that requirement of the test is the wearing of a certain article of clothing. Additional information is preferably not supplied in order to avoid predisposing or prejudicing the individual test subject toward or away from the aims of the survey. For example, if the individual were told that the survey relates to a radio survey, then this might result in more time and attention being paid to radio listening than would be normal for that person. Even worse would be the situation were the individual told the particular radio station involved in the survey. In order to avoid this problem, each individual is given an article of clothing to wear on a regular basis. For example, such an article of clothing might be a watch for men or a bracelet for women.

The drawing depicts in block form a conventional transmitter 1 for emitting radio frequency signals at one of the frequencies to which radios are tunable on either the AM or FM band. Details of such a transmitter are well known in the art. Accordingly, it is not deemed necessary to provide the circuit and structural specifics of this transmitter nor any other such details connected with a radio station.

Connected to the circuitry of transmitter 1 is circuit 3 which generates a survey signal utilized for a purpose to be described below in greater detail. Suffice it to say at this point that circuit 3 generates a modulating signal transmitted on the carrier airwave emitted by transmitter 1 so as to be detectable by radio which is tuned to the frequency of the particular radio station of interest. The survey signal is emitted at preselected time intervals, as discussed below in further detail. Its most significant feature lies in its being unique to that particular radio station. Its transmission and subsequent playback by a radio set characterize the set as being tuned to that particular station.

Transmitter 1 broadcasts its signal over the airwaves in standard fashion. These signals are picked up by a conventional radio set 4. If the radio is tuned to the radio station of interest, then the signals broadcast by transmitter 1 will be reproduced by the speaker (not shown) in radio set 4.

Up to this point, the description has involved only well known electronic units in widespread use, except for circuit 3. To implement the objects of the invention, further circuitry which will now be described is provided in miniaturized form housed in a compact enclosure of some type capable of being readily worn by an individual, as mentioned above. This compact circuit configuration is referred to below as the portable signal detector unit 5.

Portable signal detector unit 5 is shown in the drawing as including a microphone 7. The microphone is a conventional transducer capable of picking up audible signals from any conventional radio set 4. Sensitivity of the microphone is selected so as to pick up sounds emanating from radio set 4 only if it is within a distance of several feet. A very sensitive microphone is not appropriate because it may pick up sounds which are in the background rather than those which are being listened to by the test subject.

Resulting electrical signals will be input from microphone 7 to detection circuit 11. Detection circuit 11 is designed so as to be responsive only to the survey signal generated by circuit 3. Detection circuit 11 can, for example, be designed to be responsive to a certain sound pattern. It may, thus, respond to a certain sequence of musical notes of various length, frequency, and duration. A design requirement of circuit 11 might be that all the notes are detected within a certain time period. Also, each of the notes can have a time threshold. Analog and digital circuitry for providing these functions is old and well known in the art and, thus, further details are not deemed necessary.

Correspondingly, circuit 3 is arranged to produce the sound pattern built into detection circuit 11 for broadcast via transmitter 1. In fact, some radio stations already do have characteristic sounds unique to one particular station. An infinite number of possible sound patterns is available. However, it is, of course, preferable to keep the survey signal from being intrusive in terms of length and repeat frequency. In this connection, repetition of the survey signal should be frequent enough to provide meaningful test results. One would suppose that, say, once a minute would be ideal. However, this is clearly too intrusive. Preferably, taking all circumstances into account, once every 15 minutes would provide adequate information while not materially distracting or irritating the listeners. Circuits to produce desired sound patterns are old and well known in the art and, thus, further details are not deemed necessary.

When detection circuit 11 senses a signal which matches what it is designed to consider as the survey signal from circuit 3, it produces a store signal which is input to memory 13. Memory 13 may be a standard and well known IC memory circuit into which information is input into sequential designated addresses when an actuating signal, such as the store signal, is applied to it. This is a standard, well known part and its operation in this fashion is conventional. Thus, no further details about it are deemed necessary.

The information which can be stored in the memory 13 can be of several possible types. Preferably, it is the time of day which is provided to it by time circuit 15. Thus, the time is constantly applied to a suitable input line of memory 13. Storage of the time, however, only occurs when the appropriate store signal is received from detection circuit 11. Alternatively, only the incidence of the signal obtained from detection circuit 11 might be stored in memory 13 rather than the time. This requires considerably less memory but, of course, is not as informative. In this case, time circuit 15 might be eliminated.

Portable signal detector unit 5 can be accommodated in any small article of clothing which a person normally wears. For example, a male test subject might be given a wristwatch into which the various components 7, 11, 13 and 15 have been installed. Time circuit 15 is, of course, an inherent part of the watch. Many electronic watches have been developed which include a memory. Alarm-type watches include a tone producing transducer. This transducer can be replaced with a microphone to detect rather than generate sound. The remaining circuitry is implementable on a small scale and can readily be inserted into the conventional watch. For a female, the circuitry for portable signal detector unit 5 can be inserted in a bracelet, a decorative pin, or a necklace pendant.

The information stored in memory 13 can be retrieved in one of several ways. For example, the portable signal detector unit 5 can be collected at, say, monthly intervals. The contents of memory 13 are then dumped into another suitable memory from where it can be organized and analyzed as needed.

Various devices are currently available which are capable of performing the tasks discussed above. For example, Seiko markets a microprocessor-driven timepiece which it calls the Datagraph 2001. It includes a 2K RAM memory which can readily be adapted to store the above-described information. In addition, this Seiko product comes with the Datagraph 2301 interface module capable of transmitting data between the Datagraph 2001 and a computer terminal.

Information obtained in the above-described manner will indicate to what extent the test subjects were tuned to the particular radio station of interest. Only a passive wearing of the article is required. If microphone 7 picks up sounds from radio set 4, this means that the test subject is close to the radio and is likely to be listening to it. No deliberate action whatsoever on the part of any test subject is required in order to record the event. Moreover, no skewing of the test results can occur due to any suggestions because these individuals need not be informed about the purpose of the test. They are merely given the article of clothing and are asked to wear it. No more needs to be said. Consequently, the test is completely accurate in terms of fully recording one's radio listening habits, and the test is conducted under natural, real life conditions.

This technique can also provide valuable information about the type of person listening in. It lends itself to careful selection of the test subjects in terms of, for example, income, education, family size, etc. Information available about such test subject can be combined with the stored tuning habits information so that the resulting data can be analyzed together and refined into various categories of listeners.

If the time of day is recorded when a store signal is generated, an analysis can be made for the benefit of the advertiser. That time can be correlated against the time when a given commercial was broadcast. Statistics can, therefore, be provided regarding the size of the audience to which the commercial was exposed. Such time information is also valuable to the broadcasters because it reveals the popularity of the shows put on the air by that station. This information can be used to set advertising rates as well as to rearrange the programming as necessary.

If only the incidence of tuning is recorded, the broadcasters will have some indication as to the extent to which people listen to their station. However, no correlation to commercials and programming can be made.

It should be apparent that although a preferred embodiment of the invention has been described above, various modifications can readily be made. All such modifications are intended to be included within the scope of the invention as defined by the following claims.

I claim:

1. Apparatus for surveying an audience to determine whether a listener is tuned to a given radio station transmitting designated programming signals on a predetermined frequency along with a survey signal characteristic of said given radio station, said programming signals and said survey signal being detected by a radio set to provide audibly reproduced programming signals and an audibly reproduced survey signal, the apparatus comprising:

first means for detecting audible sounds reproduced by said radio set to generate a control signal corresponding to said audibly reproduced survey signal;

second means coupled to said first means for responding only to said control signal to generate a store signal in response thereto; and memory means coupled to said second means for storing a signal indicative of each detection of said control signal.

2. The apparatus of claim 1, wherein said first detecting means comprises a microphone.

3. The apparatus of claim 2, wherein said second detecting means comprises means for responding only to said control signal.

4. The apparatus of claim 3, further comprising time circuit means for providing a time signal to said memory means.

5. The apparatus of claim 4, wherein said store signal indicative of each detection of said control signal comprises the time provided by said time circuit means at which the store signal is generated.

6. The apparatus of claim 1, wherein said second detecting means comprises means for responding only to said control signal.

7. The apparatus of claim 1, further comprising time circuit means for providing a time signal to said memory means.

8. The apparatus of claim 7, wherein said store signal indicative of each detection of said control signal comprises the time provided by said time circuit means at which the store signal is generated.

9. A method of surveying an audience to determine whether a listener is tuned to a given radio station transmitting designated programming signals on a predetermined frequency along with a survey signal characteristic of said given radio station, said programming signals and said survey signal being detected by a radio set to provide audibly reproduced programming signals and an audibly reproduced survey signal, comprising the steps of:

detecting audible sounds reproduced by said radio set and generating a control signal corresponding to said audibly reproduced survey signal;

responding only to said control signal to generate a store signal in response thereto; and storing a signal indicative of such detection of said control signal.

10. Apparatus for surveying an audience to determine whether a listener is tuned to a given radio station transmitting designated programming signals on a predetermined frequency along with a survey signal characteristic of said given radio station, said programming signals and said survey signal being detected by a radio set to provide audibly reproduced programming signals and an audibly reproduced survey signal, the apparatus comprising:

means for generating a survey signal characteristic of a given radio station;

means for transmitting programming signals and a survey signal on a frequency of said given radio station;

means for reproducing said programming signals and said survey signal to generate audible programming signals and an audible survey signal;

first means for detecting audible sounds to generate a control signal corresponding to said audibly reproduced survey signal;

second means coupled to said first means for responding only to said control signal to generate a store signal in response thereto; and memory means coupled to said second detecting means for storing a signal indicative of each detection of said control signal.

* * * * *